United States Patent
Chou

(10) Patent No.: US 8,766,796 B2
(45) Date of Patent: Jul. 1, 2014

(54) METHOD FOR READING POSITION DATA FROM REMOTE PORTABLE ELECTRONIC DEVICE THROUGH SIGNAL SWITCHING NETWORK SYSTEM

(75) Inventor: Chun-Pu Chou, Yonghe (TW)

(73) Assignee: Getac Technology Corporation, Hsinchu County (TW)

( * ) Notice: Subject to any disclaimer, the term of this patent is extended or adjusted under 35 U.S.C. 154(b) by 2560 days.

(21) Appl. No.: 11/404,808

(22) Filed: Apr. 17, 2006

(65) Prior Publication Data

US 2007/0096898 A1    May 3, 2007

(30) Foreign Application Priority Data

Oct. 28, 2005    (TW) .................................. 94137976 A

(51) Int. Cl.
G08B 1/00    (2006.01)
(52) U.S. Cl.
USPC ........................................................ 340/539.2
(58) Field of Classification Search
USPC ........................................................ 340/539.2
See application file for complete search history.

(56) References Cited

U.S. PATENT DOCUMENTS

| | | | |
|---|---|---|---|
| 6,924,748 B2 * | 8/2005 | Obradovich et al. | 340/905 |
| 7,057,508 B2 * | 6/2006 | Banks et al. | 340/539.13 |
| 7,079,048 B2 * | 7/2006 | Kataoka | 340/905 |
| 7,259,668 B2 * | 8/2007 | Casey | 340/539.13 |
| 7,283,046 B2 * | 10/2007 | Culpepper et al. | 340/539.13 |
| 7,312,700 B2 * | 12/2007 | Karaoguz et al. | 340/539.1 |
| 7,319,387 B2 * | 1/2008 | Willson et al. | 340/539.13 |
| 7,378,980 B2 * | 5/2008 | McFarland | 340/686.6 |
| 7,486,185 B2 * | 2/2009 | Culpepper et al. | 340/539.13 |
| 7,504,939 B2 * | 3/2009 | Zancola et al. | 340/539.13 |
| 2007/0126573 A1 * | 6/2007 | Valania | 340/539.13 |
| 2007/0139191 A1 * | 6/2007 | Quatro | 340/539.13 |
| 2008/0007396 A1 * | 1/2008 | Parkulo et al. | 340/539.2 |

FOREIGN PATENT DOCUMENTS

| | | |
|---|---|---|
| CN | 1170415 C | 10/2004 |
| CN | 1714595 A | 12/2005 |
| WO | WO 2004/047477 | 6/2004 |

* cited by examiner

Primary Examiner — Brent Swarthout

(57) ABSTRACT

A method for reading current position data from a remote portable electronic device through a signal switching network system is provided. The remote portable electronic device, after obtaining its own position data, can transmit the current position data through a signal transmission interface and a signal transmission network of the signal switching network system to a position database on a server. A portable electronic device at the request end can login to the server through the signal transmission network of the signal switching network system, and read the current position data of the specific remote portable electronic device from the position database of the server.

21 Claims, 8 Drawing Sheets

METHOD FOR READING POSITION DATA FROM REMOTE PORTABLE ELECTRONIC DEVICE THROUGH SIGNAL SWITCHING NETWORK SYSTEM

FIELD OF THE INVENTION

The present invention relates to a method for reading current position data from a remote portable electronic device and, more particularly, to a method for reading current position data from a remote portable electronic device through a signal switching network system.

BACKGROUND OF THE INVENTION

The digital age has brought people many types of electronic devices, such as notebook computers, personal digital assistants (PDAs), and so on. The manufactures of electronic devices are constantly searching for products that enable general consumers to stay informed all the time.

The portable electronic devices that are currently available in the market include PDAs, portable computers, mobile phones, and so on. As these portable electronic devices are all used for particular applications, their circuit designs are all for that specific application. For example, the PDA is to meet the needs of the user in the data usage; therefore, the PDA provides strong functions of for example scheduling, calculation, and data management. On the other hand, mobile phones are mainly for communication; therefore, the mobiles phones can communicate through the mobile communication network.

In addition to the above digital products, the global position system (GPS) technology is also widely used in position detection and vehicle navigation.

SUMMARY OF THE INVENTION

Although the GPS and the portable electronic devices are widely used in all applications, the integration of different functions of different devices is still far from ideal. For example, although some high-end mobile phones have built-in basic PDA functions, the integration effect is not powerful enough.

For practical business application, staff control, or vehicle tracking, the current high-end products may be able to meet the needs. For the general public, the convenience of the technology is not always affordable.

For example, when a person intends to locate the position of another person, there is no other convenient way except using SMS or mobile phones to call the person. Another example is the care-taker for children, patients, elderly, or pets. These are occasions that the two-way communication is hard to accomplish, yet imperative.

Therefore, a primary object of the present invention is to provide a method for reading current position data of a remote portable electronic device. Through the method, the user at the local end can pin-point and track the location of the remote user in real time.

Another object of the present invention is to provide a method for reading current position data of a remote portable electronic device through a signal switching network system. The portable electronic device can accommodate the pre-determined signal switching network system to provide remote current position data reading.

To achieve the above objects, the present invention provides a method to enable a plurality of portable electronic devices to read current position data of other remote portable electronic devices through a signal switching network system. Every portable electronic device has group identification. The signal switching network system comprises a server and a signal transmission network. The remote portable electronic device, after obtaining its own position data, can transmit the current position data through the signal transmission interface and the signal transmission network of the signal switching network system to the position database on the server. A portable electronic device at the request end can login to the server through the signal transmission network of the signal switching network system, and read the current position data of the specific remote portable electronic device from the position database of the server.

In another embodiment of the present invention, a portable electronic device can request the current position data reading of a specific remote portable electronic device to the server. The server, upon receiving the request, will request the transmission of the current position data of that specific remote portable electronic device to the server. That specific remote portable electronic device, after obtaining its own position data, transmits the current position data through the signal transmission interface and the signal transmission network of the signal switching network system to the position database on the server. Finally, the current position data of that specific remote portable electronic device is transmitted to the requesting portable electronic device.

In comparison with the conventional methods, the present invention provides a method for reading current position data of a remote portable electronic device through a signal switching network system. The method allows the users of the same group to locate the other users with a portable electronic device. The method is applicable to various business settings and factories for people at different locations to find each other. The present invention is also applicable to the domestic care for children, elderly, patients, or pets. In addition, the signal switching network system of the present invention can use Internet or mobile communication systems for signal transmission network. The current position data can be obtained by GPS or the triangular estimation method using a plurality of base stations for mobile phones. The actual technology used for the implementation of the system is flexible and readily available.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
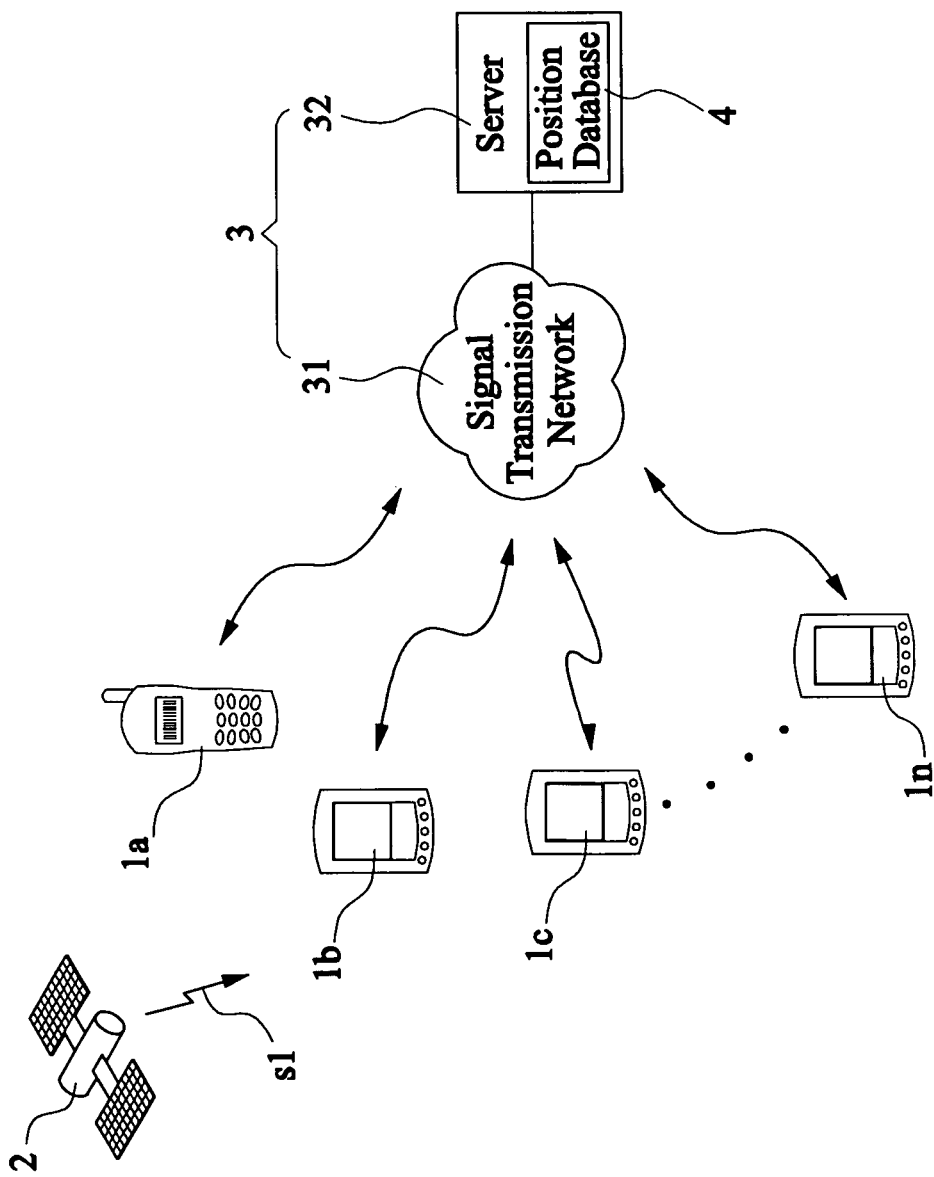
FIG. 1 is a schematic view of the system configuration of the first embodiment of the method of the present invention.

With reference to the drawings and in particular to FIG. 1, which shows a system configuration in accordance with a first embodiment of the method for reading current position data of remote portable electronic device through a signal switching network system, the system comprises a plurality of portable electronic devices 1a, 1b, 1c, ..., 1n. Each portable electronic device 1a, 1b, 1c, ..., 1n can receive a global position signal s1 from a satellite 2. The portable electronic device 1a, 1b, 1e, ..., 1n can be a PDA, portable PC, or mobile phone with the GPS-receiving and wireless signal transmission/receiving functions. Each of the portable electronic devices 1a, 1b, 1c, ..., 1n can communicate with a signal switching network system 3 using the wireless signal transmission/receiving function in order to obtain the current position data of a specific portable electronic device.

Figure 2:
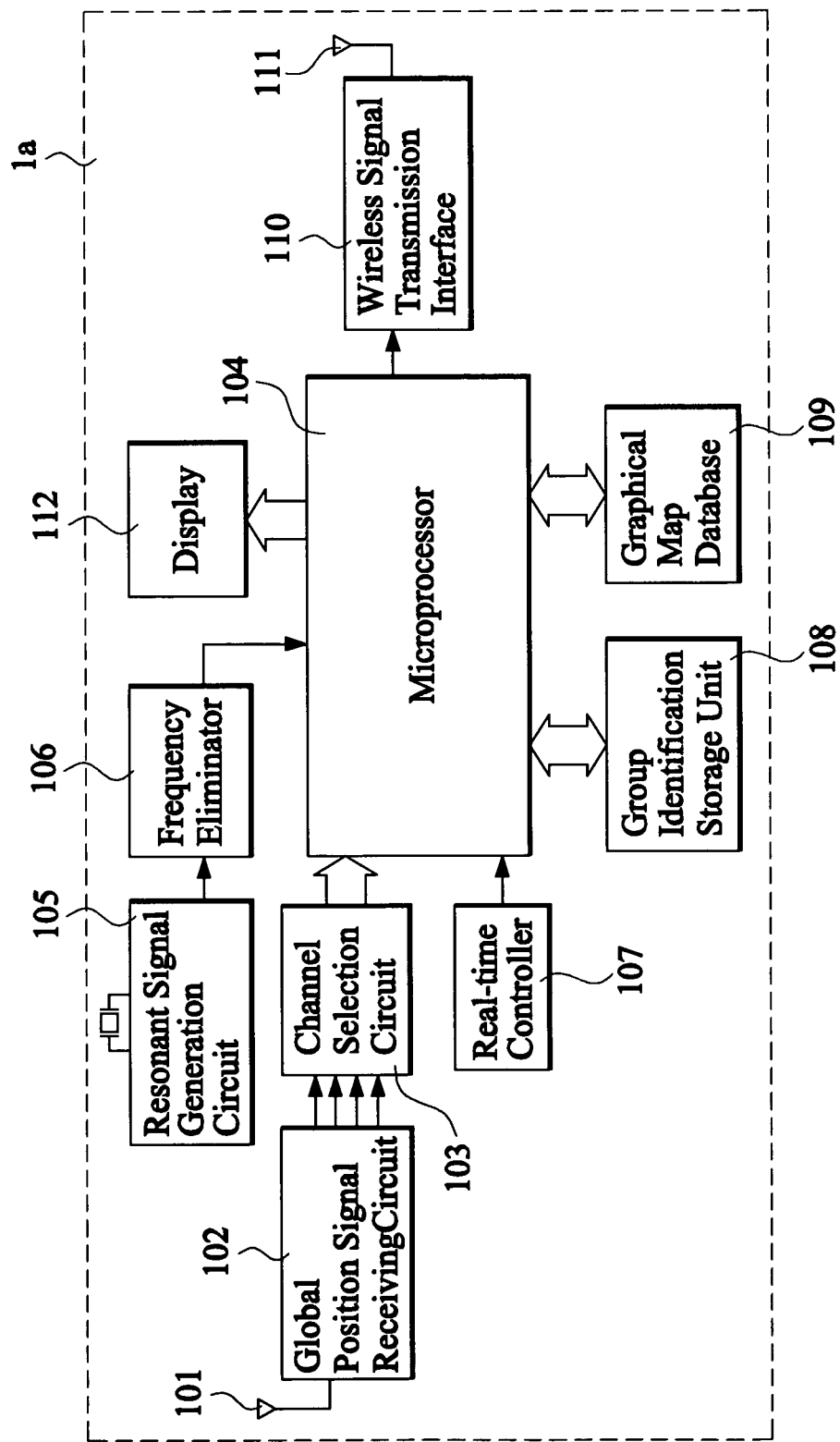
FIG. 2 is a functional block diagram of the portable electronic device of FIG. 1.

FIG. 2 shows a functional block diagram of the portable electronic device of FIG. 1. The portable electronic device comprises a satellite signal receiving antenna 101, a global position signal receiving circuit 102, a channel selection circuit 103, a microprocessor 104, a resonant signal generation circuit 105, a frequency eliminator 106, a real-time controller 107, a group identification storage unit 108, a graphical map database 109, a wireless signal transmission interface 110, and a transmission antenna 111.

Each portable electronic device comprises a group identification storage unit 108 for storing pre-determined group identification. All the portable electronic devices having the same group identification belong to the same group, and each portable electronic device of the same group can read the current position data of the other.

The global position signal receiving circuit 102 receives the global position signal s1 through the antenna 101. The signal s1, after the channel selection circuit 103, is sent to the microprocessor 104. The microprocessor 104 transmits the signal s1 through the wireless signal transmission interface 110, such as a wireless network card, and the transmission antenna 111.

The microprocessor 104 can also process the signal s1 to calculate data such as the displacement and the velocity of the user. These data can also be transmitted through the wireless signal transmission interface 110 and the transmission antenna 111.

The signal switching network system 3 comprises a signal transmission network 31 and a server 32. The current position data transmitted by the wireless signal transmission interface 110 of each portable electronic device can be received by the signal transmission network 31, and then relayed to a position database 4 on the server 32.

In the above embodiment, the signal transmission network 31 of the signal switching network system 3 can be Internet, and the server 32 is a network server on Internet.

After the current position data of each portable electronic device is transmitted and stored in the position database 4 on the server 32, any portable electronic device in the system can read the current position data of a specific remote portable electronic device from the position database 4 on the server 32 after an identification confirmation process. Because each portable electronic device comprises a graphic map database 109, which stores a graphic map data, the received current position data of the specific remote portable electronic device can be displayed on the graphic map on the display 112.

Figure 3:
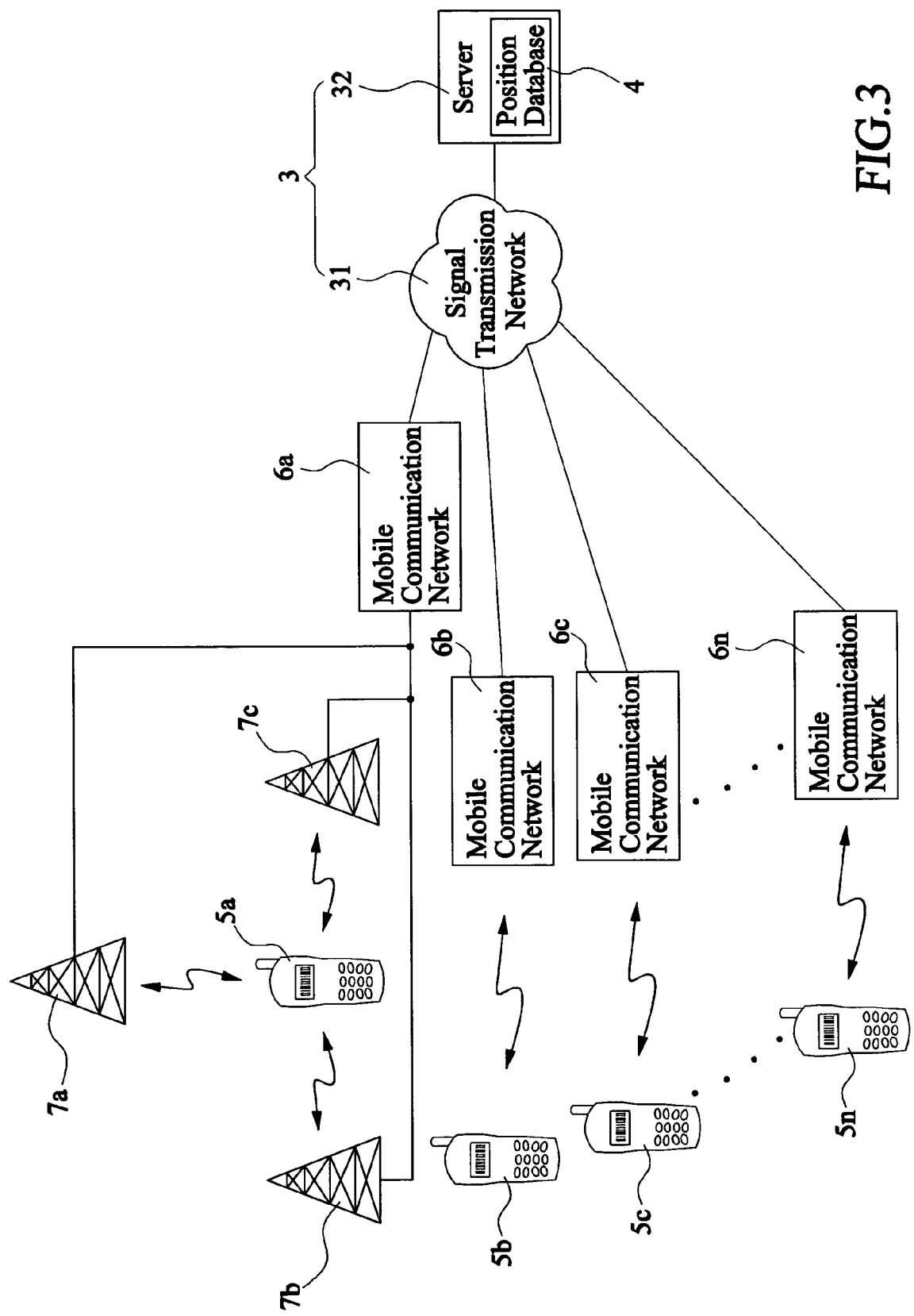
FIG. 3 is a schematic view of the system configuration of the second embodiment of the method of the present invention.

FIG. 3 shows a system configuration in accordance with a second embodiment of the method for reading current position data of remote portable electronic device through a signal switching network system. In this embodiment, the signal transmission network of the signal switching network system comprises a mobile communication network, and the server is a network server installed in the mobile communication network. Through the mobile communication network, such as GSM or GPRS mobile communication network, the current position data of each portable electronic device can also be obtained.

The embodiment also includes a plurality of portable electronic devices 5a, 5b, 5c, ..., 5n. Each portable electronic device 5a, 5b, 5c, ..., 5n can be a PDA, portable PC, or mobile phone with the mobile communication functions.

Each portable electronic device 5a, 5b, 5c, ..., 5n can obtain the current position data of every portable electronic device through the mobile communication network. That is, each portable electronic device can use at least three nearby mobile base stations 7a, 7b, 7c to calculate the location of a specific portable electronic device by measuring the respective distance between the specific portable electronic device and the base stations. The current position data of the portable electronic device 5a, 5b, 5e, ..., 5n can be transmitted to the position database 4 of the server 32 through mobile communication network 6a, 6b, 6e, ..., 6n and the signal transmission network 31.

Figure 4:
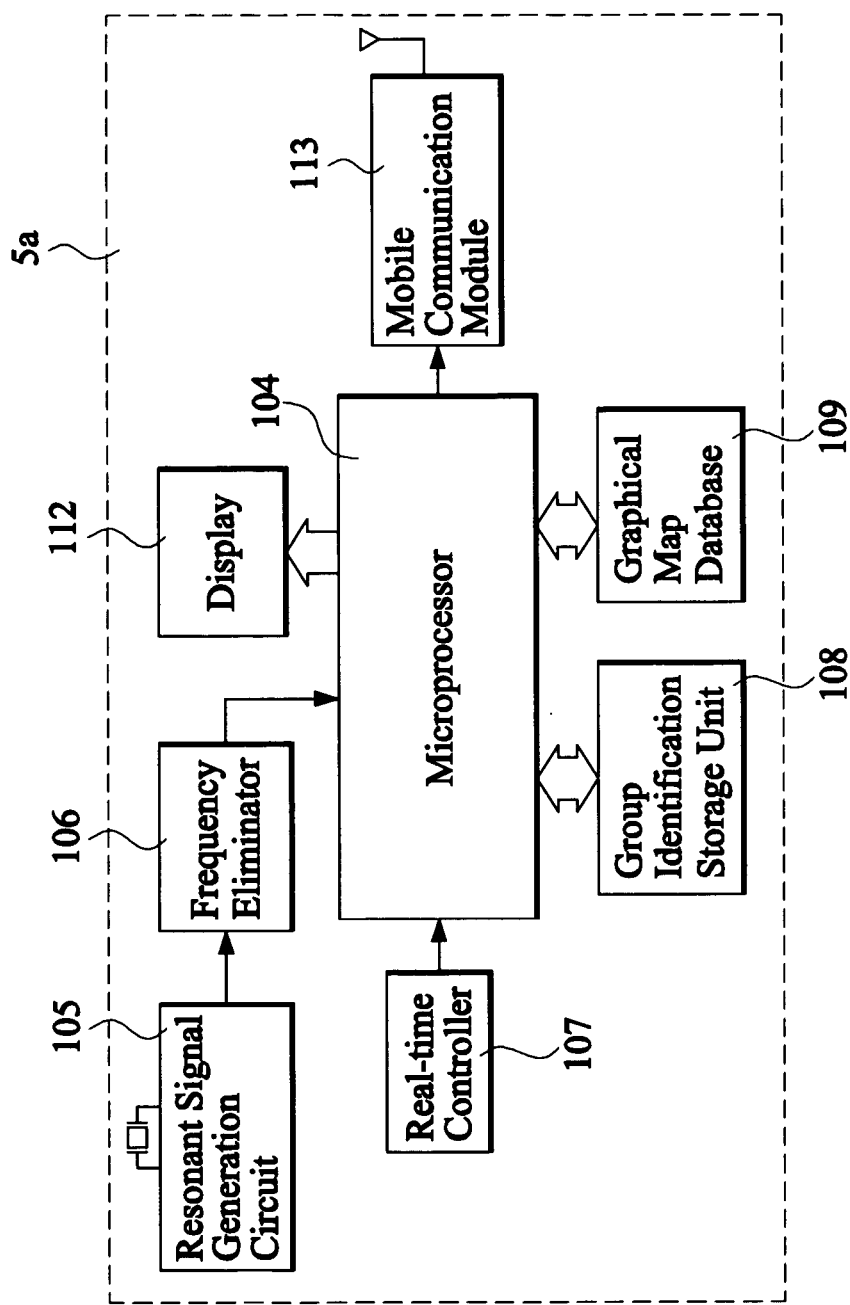
FIG. 4 is a functional block diagram of the portable electronic device of FIG. 3.

FIG. 4 shows the functional block diagram of the portable electronic device of FIG. 3. The circuit functions are similar to those of FIG. 2. The portable electronic device comprises a microprocessor 104, a resonant signal generation circuit 105, a frequency eliminator 106, a real-time controller 107, a group identification storage unit 108, a graphical map database 109, and a mobile communication module 113. The portable electronic device can perform the communication through the mobile communication module 113, the mobile communication base station and the mobile communication network.

Figure 5:
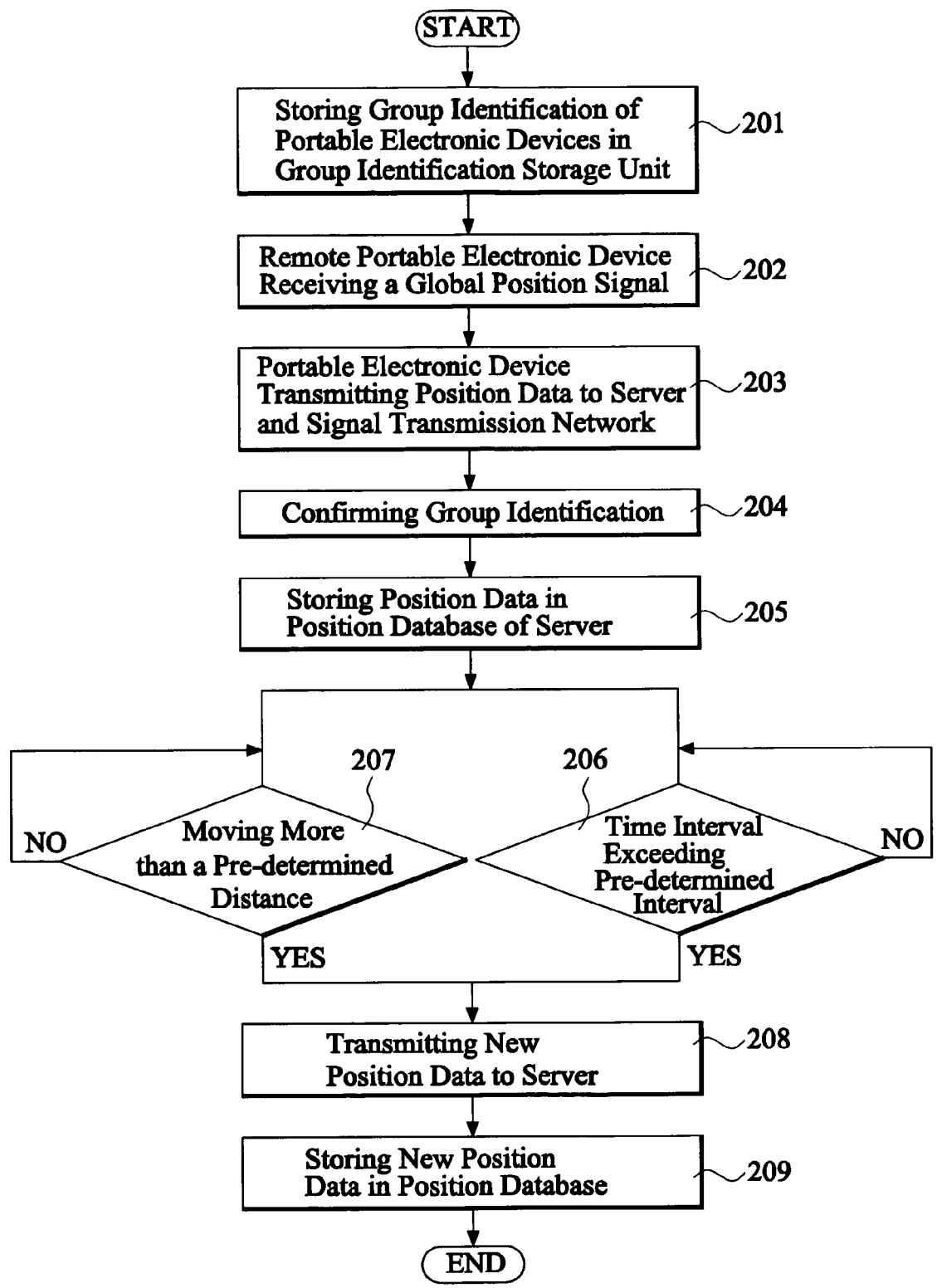
FIG. 5 is a control flowchart of the first embodiment.
Figure 6:
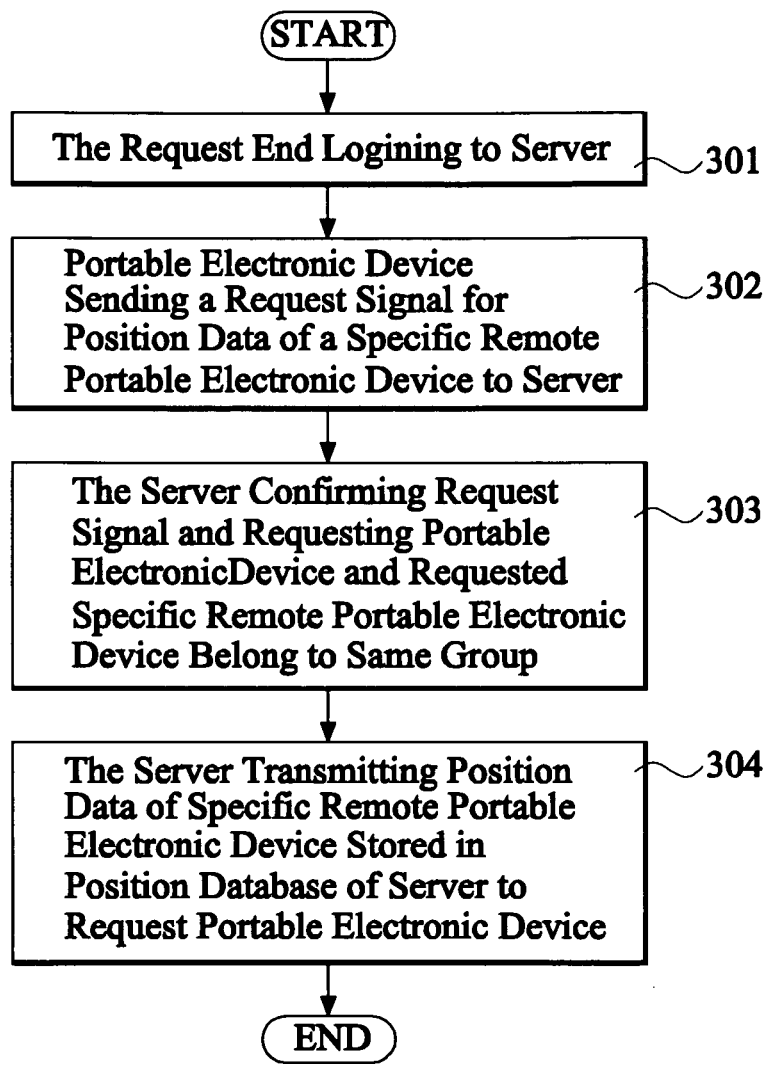
FIG. 6 is the control flowchart of the present invention during the receiving of position data.

FIGS. 5 and 6 show the flowchart of the first embodiment of the present invention. First, the group relationship among a plurality of portable electronic devices is established in a signal switching network system. This step can be realized by storing in the group identification storage unit the group identification of the portable electronic devices that are allowed to transmit and receive the current position data to each other (step 201). All the portable electronic devices having the same group identification belong to the same group, and the portable electronic devices belonging to the same group can transmit and receive current position data to each other.

When a remote portable electronic device receives a global position signal s1 through the global position signal receiving circuit of FIG. 2 or through the triangular estimation of three mobile communication base stations of FIG. 3 (step 202), the portable electronic device will transmit the current position data to the server 32 through the wireless signal transmission interface 110, and the signal transmission network 31 of the signal switching network system 3 (step 203).

After a group identification confirmation step (step 204), the current position data will be stored in the position database 4 of the server 32 (step 205) if confirmed.

To achieve the object of real-time and dynamic transmission of position data, the present invention can also provide periodic transmission of current position data of each portable electronic device at a pre-determined interval. For example, when the time interval since the last transmission exceeds the pre-determined interval, say 5 minutes (step 206), the new current position data is transmitted to the server (step 208).

In addition, when the portable electronic device moves more than a pre-determined distance (step 207), the new current position data is also transmitted to the position database 4 of the server 32. For example, when the user with the portable electronic device moves further than a pre-determined distance, say, 5 meters, the new current position data is transmitted to the server (step 208).

After server 32 receives the current position data from the portable electronic device, the new current position data is stored in the position database 4 (step 209).

FIG. 6 shows the control flowchart of the present invention during receiving position data. First, after the portable electronic device at the request end can login to the server 32 through the signal transmission network 31 of the signal switching network system 3 (step 301), the portable electronic device sends a request signal for current position data of a specific remote portable electronic device to the server 32 (step 302). After the server 32 confirms the request signal and confirms that the requesting portable electronic device and the requested specific remote portable electronic device belong to the same group (step 303), the server 32 transmits the current position data of the specific remote portable electronic device stored in the position database 4 of the server 32 to the request portable electronic device (step 304).

Figure 7:
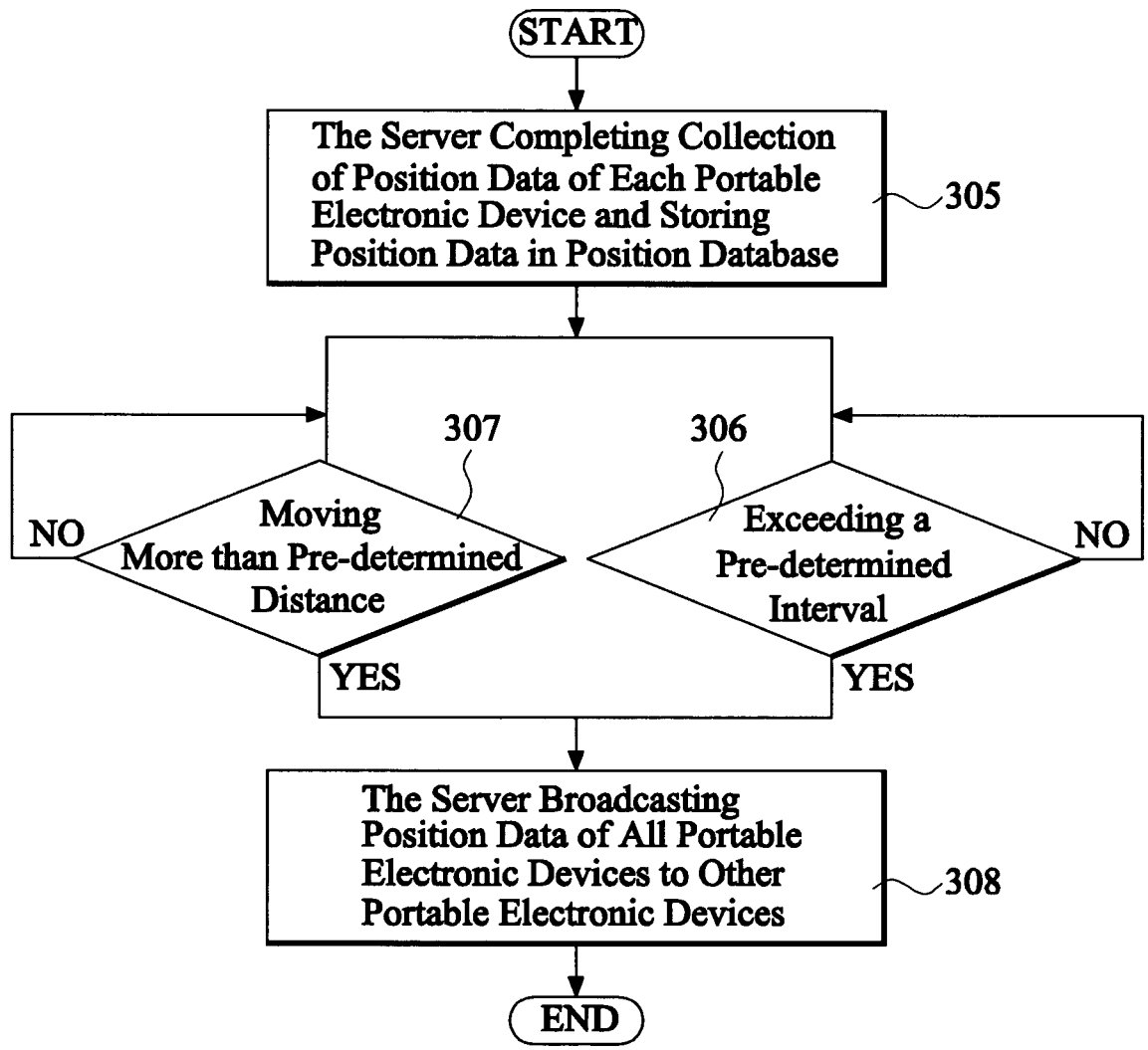
FIG. 7 is a control flowchart of the present invention during the broadcasting of the current position data of the portable electronic devices of the group to the other portable electronic devices.

In the control flow of FIG. 6, the server 32 only transmits current position data to the requesting portable electronic device when receiving requests. The present invention can also proactively transmit the position data. FIG. 7 shows a control flowchart of the present invention, after receiving the position data, proactively broadcasting the current position data of the portable electronic devices of the group to the other portable electronic devices.

When the server 32 completes the collection of current position data of each portable electronic device and stores the current position data in the position database 4 (step 305), the server 32 can proactively broadcast the current position data under a pre-determined broadcasting condition. For example, the pre-determined broadcasting condition is that when a pre-determined interval is exceeded (step 306), for example, 5 minutes, or a portable electronic device moves more than a pre-determined distance (step 307). The server 32 will broadcast the current position data of all portable electronic devices to other portable electronic devices (step 308).

Figure 8:
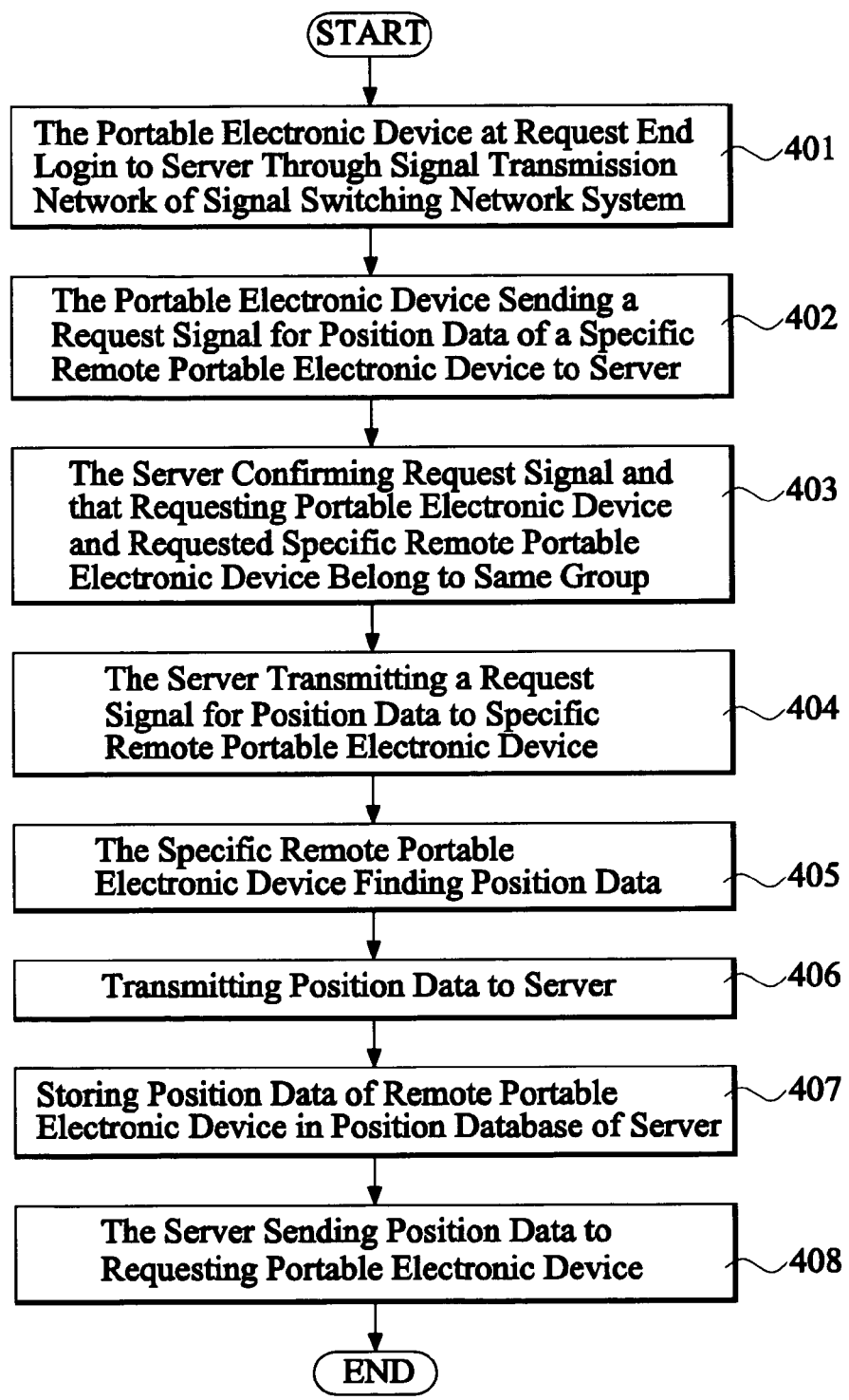
FIG. 8 is a control flowchart of the second embodiment.

FIG. 8 shows the control flowchart of the second embodiment of the present invention. First, after the portable electronic device at the request end can login to the server 32 through the signal transmission network 31 of the signal switching network system 3 (step 401), the portable electronic device sends a request signal for current position data of a specific remote portable electronic device to the server 32 (step 402). After the server 32 confirms the request signal and confirms that the requesting portable electronic device and the requested specific remote portable electronic device belong to the same group (step 403), the server 32 transmits a request signal for the current position data to the specific remote portable electronic device through the signal transmission network 31 of the signal switching network system 3 (step 404).

After the specific remote portable electronic device receives the request signal for position data, the specific remote portable electronic device will receive the global position signal from the satellite 2 through the global position receiving circuit 102, or uses the triangular measurement method with three base stations to find the current position data (step 405). Then, the current position data is transmitted to the server 32 through the wireless signal interface 110 and the signal transmission network 31 of the signal switching network system 3 (step 406). The current position data of the remote portable electronic device will be stored in the position database 4 of the server 32 (step 407), and then the server 32 sends the current position data to the requesting portable electronic device (step 408).

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for reading current position data from a plurality of portable electronic devices through a signal switching network system, the plurality of portable electronic devices being divided into a plurality of groups, each portable electronic device having a group identification according to the group to which it belongs, the signal switching network system comprising a server and a signal transmission network, the method comprising the steps of:
   (a) a plurality of remote portable electronic devices obtaining at least a current position data thereof;
   (b) each remote portable electronic device sending the current position data through a signal transmission interface and the signal transmission network of the signal switching network system to a position database of the server;
   (c) a requesting portable electronic device logging into the server through the signal transmission network of the signal switching network system; and
   (d) the requesting portable electronic device reading the current position data of a specific remote portable electronic device from the position database of the server when the requesting portable electronic device and the specific remote portable electronic device have the same group identification, wherein each portable electronic device can read the current position data of each other portable electronic device in the same group.

2. The method as claimed in claim 1, wherein the current position data of each remote portable electronic device is a global position signal obtained by a global signal position circuit from a satellite in step (a).

3. The method as claimed in claim 1, wherein the current position data of each remote portable electronic device is obtained by calculation using at least three mobile communication base stations in step (a).

4. The method as claimed in claim 1, wherein each remote portable electronic device transmits an updated current position data to the position database of the sever at a pre-determined interval in step (b).

5. The method as claimed in claim 1, wherein each remote portable electronic device transmits an updated current position data to the position database of the sever when the remote portable electronic device move beyond a pre-determined distance in step (b).

6. The method as claimed in claim 1, wherein step (c) further comprises the following steps:
   (c1) a requesting portable electronic device sending a request for reading the current position data of the specific remote portable electronic device to the server; and
   (c2) the server confirming the group identification of the requesting portable electronic device.

7. The method as claimed in claim 1, wherein the signal transmission network of the signal switching network system is an Internet system, and the server is a network server installed in the Internet system.

8. The method as claimed in claim 1, wherein the signal transmission network of the signal switching network system comprises a mobile communication network, and the server is a network server installed in the mobile communication network.

9. The method as claimed in claim 1, wherein each portable electronic device is connected to the signal transmission network of the signal switching network system through a wireless signal transmission interface.

10. The method as claimed in claim 1, wherein each portable electronic device comprises a graphic map database storing map data so that, after receiving the position data, the received current position data is displayed on the map data.

11. A method for reading current position data through a signal switching network system, applicable to a plurality of portable electronic devices divided into plurality of groups, each portable electronic device having a group identification according to which group it belongs, the signal switching network system having a server and a signal transmission network, the method comprising the steps of:
   (a) each portable electronic device obtaining a current position data;
   (b) each portable electronic device sending the current position data through a signal transmission interface and the signal transmission network of the signal switching network system to a position database of the server; and
   (c) on a pre-determined condition, the server proactively transmitting to each portable electronic device the current position data of all other portable electronic devices having the same group identification to.

12. The method as claimed in claim 11, wherein the current position data of each remote portable electronic device is a global position signal obtained by a global signal position circuit from a satellite in step (a).

13. The method as claimed in claim 11, wherein the current position data of each remote portable electronic device is obtained by calculation using at least three mobile communication base stations in step (a).

14. The method as claimed in claim 11, wherein each remote portable electronic device transmits an updated current position data to the position database of the sever at a pre-determined interval in step (b).

15. The method as claimed in claim 11, wherein each remote portable electronic device transmits an updated current position data to the position database of the sever when the remote portable electronic device move beyond a pre-determined distance in step (b).

16. The method as claimed in claim 11, wherein the pre-determined condition in step (c) is the server transmitting the current position data at a pre-determined interval.

17. The method as claimed in claim 11, wherein the pre-determined condition in step (c) is the remote portable electronic device moving beyond a pre-determined distance.

18. The method as claimed in claim 11, wherein the signal transmission network of the signal switching network system is an Internet system, and the server is a network server installed in the Internet system.

19. The method as claimed in claim 11, wherein the signal transmission network of the signal switching network system comprises a mobile communication network, and the server is a network server installed in the mobile communication network.

20. The method as claimed in claim 11, wherein each portable electronic device is connected to the signal transmission network of the signal switching network system through a wireless signal transmission interface.

21. The method as claimed in claim 11, wherein each portable electronic device comprises a graphic map database storing map data so that, after receiving the position data, the received current position data is displayed on the map data.

* * * * *